P. WALL.
CAN OR RECEPTACLE.
APPLICATION FILED APR. 13, 1921.
1,407,903.  Patented Feb. 28, 1922.
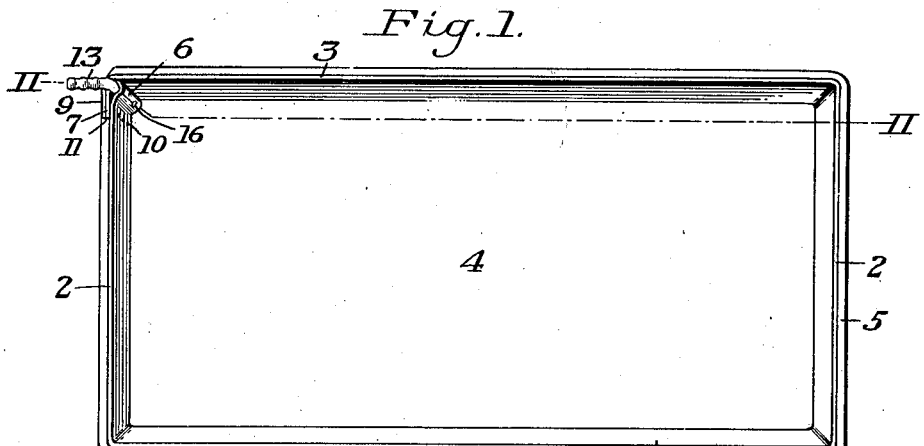
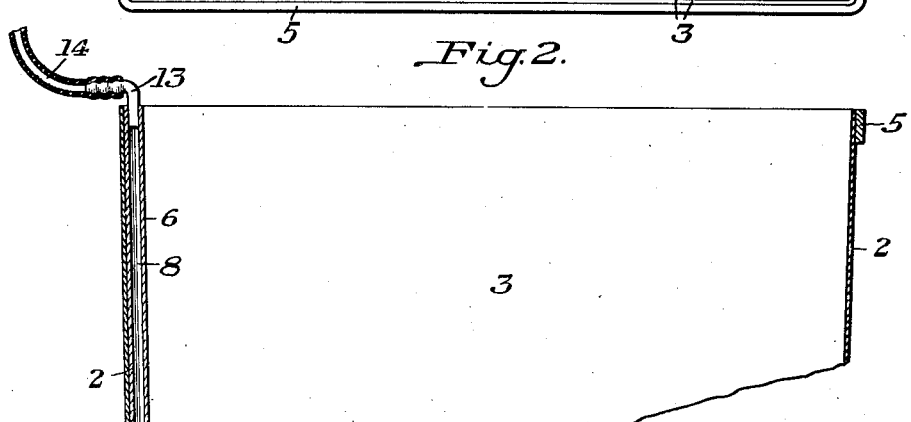
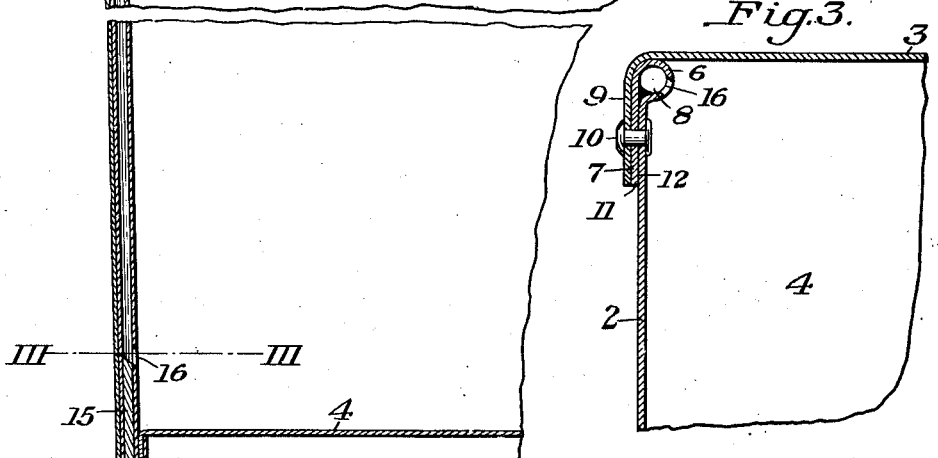
INVENTOR.
Patrick Wall,
his atty.

UNITED STATES PATENT OFFICE.

PATRICK WALL, OF PITTSBURGH, PENNSYLVANIA.

CAN OR RECEPTACLE.

1,407,903.  Specification of Letters Patent.  Patented Feb. 28, 1922.

Application filed April 13, 1921. Serial No. 461,111.

*To all whom it may concern:*

Be it known that I, PATRICK WALL, a citizen of the United States, residing in Pittsburgh, in the county of Allegheny and State of Pennsylvania, have invented a new and useful Improvement in Cans or Receptacles, of which the following is a full, clear, and exact description.

The present invention relates broadly to cans or receptacles, and more particularly to devices of this nature adapted to be used as ice molds in the manufacture of artificial ice.

An important object of the present invention is to provide a mold particularly adapted for use in the manufacture of ice from natural or raw water as distinguished from distilled water.

Another object of the invention is to provide a mold with a pressure or agitating pipe formed integral therewith during the manufacture of the mold.

Still another object of the invention is to provide a mold having one of the walls shaped to form a pressure pipe through which air may be passed during the freezing operation to keep the raw water in the mold thoroughly agitated.

The foregoing and other objects of the present invention, together with their attendant advantages, will be apparent as the invention becomes better understood by reference to the accompanying specification and drawings forming a part thereof, it being premised that changes may be made in the various details and manner of operation within the scope of the appended claims without departing from the spirit of the invention.

Figure 1 is a top plan view of a mold constructed in accordance with the present invention;

Figure 2 is a vertical sectional view through a portion of the mold taken on the line II—II of Figure 1, and Figure 3 is a sectional view on an enlarged scale on the line III—III of Figure 2.

It is well known to those familiar with the art of refrigeration that in making ice from natural or raw water, it is essential to maintain the water in a state of agitation during the freezing to gradually move the impure water and the sediment toward the upper portion of the mold. In this manner a clear cake of ice can be produced.

Heretofore various methods of agitation have been employed, but one of the simplest has been to pass air under pressure through a pipe soldered to one of the walls of the mold. Due to the fact that the molds are usually constructed of galvanized material, it is difficult to effect a firm union between the molds and the pipes, and the pipes have had a tendency to break away from the molds with the cake of ice. With a mold constructed in accordance with the present invention, the foregoing disadvantages are entirely eliminated.

Referring more particularly to the drawings, there is illustrated a rectangular mold of gradually tapering formation having the usual end walls 2 and side walls 3. A bottom 4 may be secured in position in any desired manner as is customary in this art and, if desired, reinforcing means 5 may be provided for certain portions of the mold.

According to the present invention, one of the end walls 2, during the manufacture of the mold, has a portion 6 adjacent one edge thereof bent inwardly toward the interior of the mold and then bent upon itself as indicated at 7, to form an air pipe 8 extending the entire depth of the mold. The edge portion 9 of one of the side walls 3 is then bent over the edge 7 and the parts have rivets 10 passed therethrough to secure the same firmly in position. It is desirable, after the riveting operation has taken place, to scour the edges 11 and a portion 12 of the end wall 2, and then immerse the corner of the mold in a molten bath of solder which flows into the crevices and forms a tight joint at the corner of the mold.

Suitably secured in the upper end of the pipe 8 is an angular nipple 13 adapted to have a pressure hose 14 connected thereto for blowing air into the pipe. At its lower end the pipe 8 may be closed by a plug 15, preferably sweated in position, and having its upper end terminating adjacent an opening 16 formed in the side wall of the pipe 8 to permit the air to pass into the body of water and thoroughly agitate the same. The plug 15 may be of any suitable length so that the opening 16 for the admission of air may be at any desired point. During the soldering operation, as before described, a small amount of air may be passed through the pipe 8 to prevent the solder from flowing into the interior thereof. By reason of the present construction, it will be apparent that there is provided an air pipe which is an integral part of the mold structure, and there is no tendency for the pipe to become loosened or displaced during the freezing operation, or the subsequent removal of the cakes of ice from the mold.

The advantages of the present invention arise from the integral construction provided whereby the handling of the molds is facilitated and the durability greatly increased.

I claim:

1. As an article of manufacture, an ice mould having a portion of one of the walls bent over upon itself to form an air pipe, means for simultaneously securing said bent-over portion and an adjacent wall of the tank together, and means for closing one end of the pipe, substantially as described.

2. As an article of manufacture, an ice mold having an edge portion of one of the walls overlapped upon itself to form an air pipe, means for securing said overlapped portion to the adjacent wall of the tank to provide a seamless closure between the interior of the pipe and the interior of the tank, and means for closing one end of the pipe, substantially as described.

3. A receptacle, having a complete pipe formed as an integral part thereof and extending substantially parallel with one wall of the receptacle, there being a seamless portion of the receptacle body constituting the portion of the wall of said pipe lying in the interior of the receptacle, substantially as described.

4. A receptacle, having a complete pipe formed as an integral part thereof and extending substantially parallel with one wall of the receptacle throughout substantially one dimension thereof, there being a seamless integral portion of the rceptacle body constituting the portion of the wall of said pipe lying in the interior of the receptacle, substantially as described.

5. A receptacle, having one of the walls thereof shaped to form a complete air pipe with a portion of the wall forming a seamless closure between the interior of the pipe and the interior of the receptacle, substantially as described.

6. A substantially rectangular receptacle, having a complete air pipe formed as an integral part thereof and located adjacent one of the corners of the receptacle with a portion of the receptacle body forming a seamless closure between the interior of the pipe and the interior of the receptacle, substantially as described.

7. As an article of manufacture, a metallic ice mold having one of the walls thereof bent upon itself to form a complete integral air pipe having a seamless integral metallic wall intermediate the interior of the pipe and the interior of the mold, substantially as described.

8. As an article of manufacture, an ice mold having one of the walls thereof shaped to form a complete air pipe extending substantially throughout one dimension of the mold, a seamless wall of said pipe lying between the interior thereof and the interior of the mold, means for supplying air to the upper end of said pipe, and means for closing the opposite end of said pipe, said pipe being provided with an opening permitting the escape of air into the interior of the mold, substantially as described.

9. As an article of manufacture, an ice mold having one of the walls bent over upon itself to form a complete integral air pipe presenting a seamless wall to the interior of the mold, and means for securing said bent over portion to the adjacent wall, substantially as described.

10. As an article of manufacture, an ice mold having one of the walls bent over upon itself adjacent one corner of the mold to form a complete integral air pipe presenting a seamless wall to the interior of the mold, and means for securing said bent over portion to the adjacent wall, substantially as described.

In testimony whereof, I have hereunto set my hand.

PATRICK WALL.